United States Patent [19]

Kondo

[11] 4,040,067
[45] Aug. 2, 1977

[54] PHOTOGRAPHIC CAMERA WITH AUTOMATICALLY CONTROLLED FILTER

[75] Inventor: Toshihiro Kondo, Chofu, Japan

[73] Assignees: Toshihiro Kondo, Chofu; Fuji Photo Film Co., Ltd., Minami-ashigara, both of Japan

[21] Appl. No.: 614,020

[22] Filed: Sept. 17, 1975

[51] Int. Cl.² .............................................. G03B 7/08
[52] U.S. Cl. ................................. 354/23 D; 354/53; 354/59; 354/60 L
[58] Field of Search ..................... 354/23 D, 227, 295, 354/59; 350/159

[56] References Cited

U.S. PATENT DOCUMENTS

| | | | |
|---|---|---|---|
| 2,351,932 | 6/1944 | Deckel et al. | 350/159 |
| 2,825,271 | 4/1958 | McKae | 350/159 |
| 3,433,139 | 3/1969 | Beyen et al. | 354/227 |
| 3,732,793 | 5/1973 | Tague | 354/295 |
| 3,815,982 | 6/1974 | Wagensonner | 354/227 |
| 3,896,455 | 7/1975 | Steinbatz | 354/23 D |
| 3,928,858 | 12/1975 | Sakurada et al. | 354/23 D |

Primary Examiner—Russell E. Adams

[57] ABSTRACT

An optical filter the density of which is variable is provided in the optical path of the taking lens. The density of the filter is controlled to effect optimum exposure with freely selected aperture size and the shutter speed by means of an exposure control circuit. The density of the filter is varied by moving a filter operating member which is driven by a filter driving means. The stroke of the filter operating member is controlled by means operated by electric pulses supplied by an electric circuit connected with a light measuring circuit including a photodetector to measure the scene brightness. The electric circuit for supplying the pulses for controlling the filter includes exposure factor input means and an arithmetic unit employing logic circuits.

8 Claims, 34 Drawing Figures

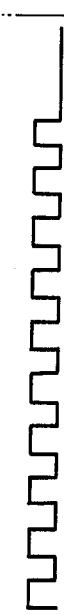
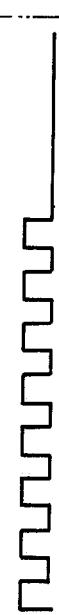
FIG.4A CLOCK PULSE
FIG.4B BV GATE SIGNAL
FIG.4C BV OUTPUT PULSE
FIG.4D AV GATE SIGNAL
FIG.4E AV OUTPUT PULSE
FIG.4F SV GATE SIGNAL
FIG.4G SV OUTPUT PULSE
FIG.4H TV GATE SIGNAL
FIG.4I TV OUTPUT PULSE
FIG.4J OUTPUT SUM

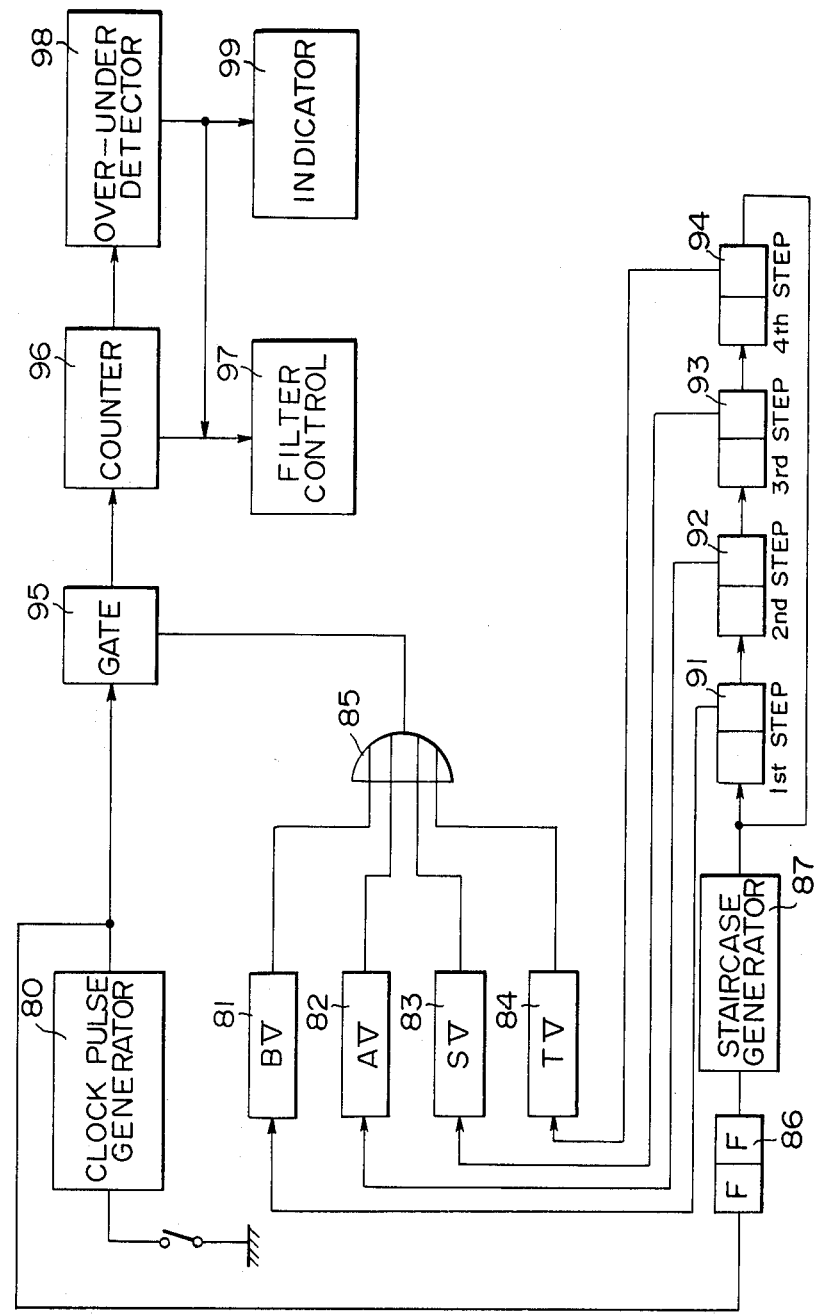

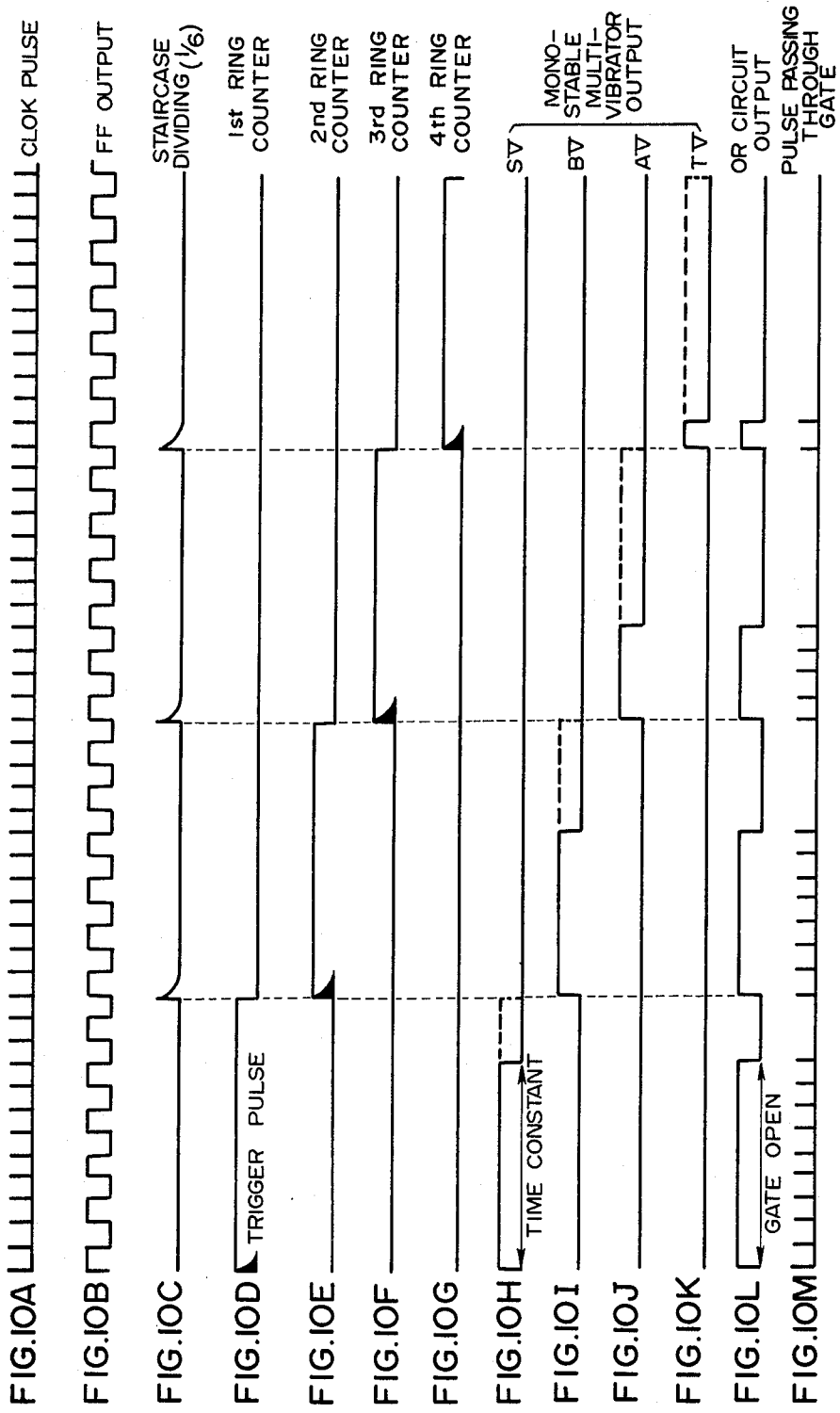

PHOTOGRAPHIC CAMERA WITH AUTOMATICALLY CONTROLLED FILTER

CROSS REFERENCE TO RELATED APPLICATIONS

This application relates to subject matter similar to that disclosed in co-pending U.S. application Ser. No. 578,948 filed May 19, 1975, by the present inventor.

BACKGROUND OF THE INVENTION

1. Field of the Invention

This invention relates to an automatic exposure control camera, and more particularly to a photographic camera with an exposure control means wherein the aperture size of a diaphragm and the shutter speed are freely selected and the density of a filter is automatically controlled in accordance with the scene brightness.

2. Description of the Prior Art

In the conventional automatic exposure control camera, either the aperture size of a diaphragm or the shutter speed is freely selected in advance and the remaining one is automatically controlled by use of an exposure control circuit. In addition to this ordinary type of the automatic exposure control camera, it has also been known in the art to automatically select a combination of an aperture size and a shutter speed from a group of predetermined combinations thereof in accordance with the scene brightness measured by use of an exposure measuring circuit and an exposure control circuit connected therewith. In these conventional automatic exposure control cameras, only two variables, i.e. the aperture size and the shutter speed, are used to determine the exposure. The film sensitivity is of course introduced into the exposure control means as input information to determine the exposure. Therefore, if one of the two variables is preselected, the other is automatically determined by the exposure control means.

However, in the photographic technique, the aperturesize has an important role in addition to that of exposure control, namely, that of determining the focal depth. Further, the shutter speed also has an important role in addition to that of exposure control, namely, that of determining the degree of blur. Therefore, it is desirable to freely select both the aperture size and the shutter speed to obtain a photograph of desirable sharpness and blur. As described hereinabove, in the conventional photographic cameras with an exposure control means, it has been impossible to freely select both the aperture size and the shutter speed.

SUMMARY OF THE INVENTION

In view of the above description of and observations regarding the conventional photographic cameras with an exposure control means, it is the primary object of the present invention to provide a photographic camera with an exposure control means in which both the aperture size and the shutter speed can freely be selected.

Another object of the present invention is to provide a photographic camera having a density-variable optical filter which is controlled to vary its density in accordance with the scene brightness to obtain photographs of optimum exposure by use of an exposure control means.

Still another object of the present invention is to provide a photographic camera having a density-variable optical filter comprising a pair of polarization filters one of which is rotated with respect to the other to vary the density or the transmittivity thereof by an exposure control means.

A further object of the present invention is to provide a photographic camera having a density-variable optical filter the density of which is automatically controlled by means of an exposure control means in which the stroke of the movement a mechanical movable member to vary the density of the filter is controlled by use of a pulse driven means operated by an electric circuit which gives a controlled number of pulses corresponding to the exposure conditions.

The above objects are accomplished by providing an optical filter in the optical path of the taking lens the optical density or transmittivity of which optical filter is automatically varied by means of an exposure control means including a light measuring circuit in which two factors, the aperture size of diaphragm and the shutter speed, are taken into account.

In the photographic camera in accordance with the present invention, a filter operating member which is moved to vary the density of the density-variable optical filter is controlled of its stroke of movement by use of means operated by electric pulses generated by an electric circuit connected to a light measuring circuit.

In order to drive said filter operating member to vary the density of an optical filter, a filter driving means is used. As the filter driving means, any kind of driving means can be employed such as a spring, an electric motor, a combination of a permanent magnet and an electomagnetic coil, and gas pressure.

As the density-variable optical filter, there can be used any of various kinds of optical filters the density or transmittivity of which can be varied such as a pair of polarization filters one of which is rotatable with respect to the other, a pair of optical pattern plates one of which is rotated or moved with respect to the other to vary or change the total amount of light passing therethrough, or a liquid density filter the thickness of which can be varied to vary the transmittivity thereof. Filters of such type whose density or light transmittivity is variable will hereinafter be referred to generally as "density-variable optical filters" or simply as "variable filters".

In this invention, the above variable filter is controlled by use of a ratchet hook which is driven by an electromagnet connected with a control circuit. The ratchet hook is releasably engaged with a ratchet gear for operating a filter driving means and repeatedly put into engagement with and released from the ratchet gear by pulses transmitted to the electromagnet so that the stroke of the movement of the ratchet gear may be controlled by the number of pulses.

As will be understood from the above description, the present invention can be embodied in a variety of combinations of the filter driving means and the density-variable optical filter.

In the present invention, it should be noted that the sensitivity of the film used must be considerably high in comparison with that of the film used in the conventional photograhic cameras, since the quantity of incident light is attenuated by the variable filter. In practical use, the sensitivity of the film used in the camera according to this invention should preferably be over ASA3000. As an example of such a high-sensitivity film which is commercially available, is known "TYPE 410" made by Polaroid Corporation the sensitivity of which is ASA10000.

BRIEF DESCRIPTION OF THE DRAWING

FIGS. 4A to 4J are graphs showing waveforms of pulses and signals employed in the filter control circuit as shown in FIG. 3, FIG. 9 is a schematic diagram showing another embodiment of the filter control circuit for supply pulses to a pulse driven filter controlling means, FIGS. 10A to 10M are graphs showing waveforms of pulses and signals employed in the filter control circuit as shown in FIG. 9.

DESCRIPTION OF THE PREFERRED EMBODIMENTS

An embodiment of the present invention in which a motor is used for driving a filter operating member and a pair of polarization filters are used as the variable filter will hereinbelow be described in detail referring to FIGS. 1 and 2.

Figure 1:
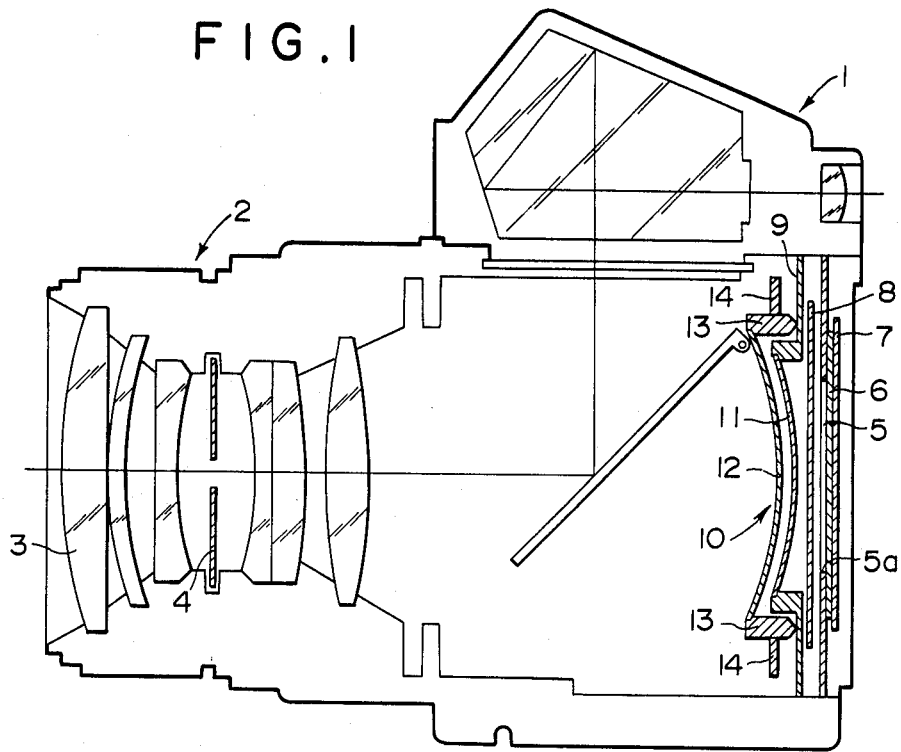
FIG. 1 is a schematic longitudinal sectional view of a photographic camera provided with a density-variable optical filter comprising a pair of polarization filters in accordance with an embodiment of the present invention.

FIG. 1 illustrates a single lens reflex camera in which the present invention is embodied. A camera body 1 is provided with a lens barrel 2 on the front face thereof. The lens barrel 2 is provided with a taking lens system 3 anda diaphragm 4. In the back of the camera body 1 is provided an aperture plate 5 having an aperture 5a on the back of which is pressed a film 6 by a film pressure plate 7. In front of the aperture plate 5 is provided a focal plane shutter 8. In front of the focal plane shutter 8 is provided a fixed plate 9 to which a variable filter 10 is mounted. The variable filter 10 is comprised of a fixed polarization filter 11 fixed to the plate 9 and a rotatable polarization filter 12 fixed to a rotatable ring 13. The rotatable ring 13 rotates about the optical axis of the taking lens 3 and supports the rotatable polarization filter 12 in parallel to the fixed polarization filter 11. The ring 13 is provided with a flange 14 on the outer periphery thereof which flange 14 is provided on the periphery thereof with teeth 14a as shown in FIG. 2.

Figure 2:
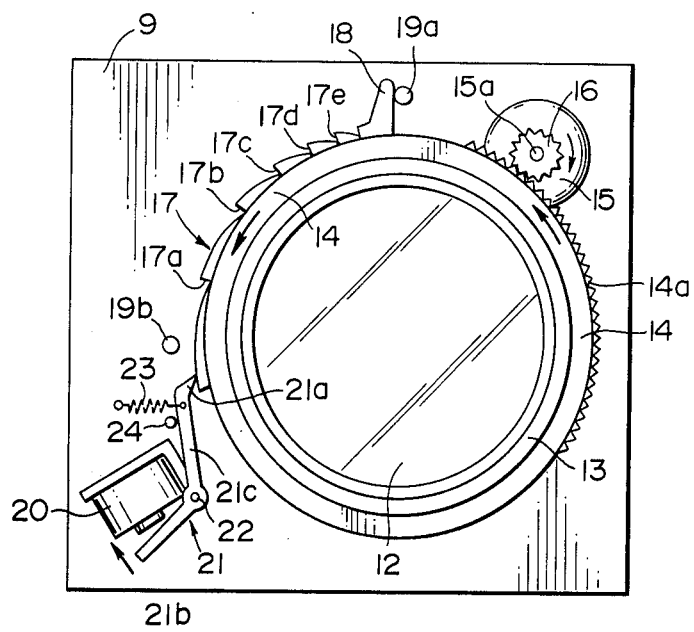
FIG. 2 is a front view showing a filter operating mechanism employed in an embodiment of the present invention in which a motor and polarization filters are employed.

Referring to FIG. 2, the teeth 14a are meshed with a pinion 16 fixed to a shaft 15a of a motor 15 so that the rotatable ring 13 may be rotated together with the rotatable polarization filter 12 by the rotation of the motor 15. The rotatable ring 13 is further provided on the periphery thereof with a serrated portion 17 comprising a number of stopper teeth 17a, 17b, 17c, . . . 17e. In the vicinity of the serrated portion 17 is provided a stopper lever 21 an intermediate point of which is pivotally mounted to a pivot 22. The stopper lever 21 has a stopper tip 21a to fall into engagement with said serrated portion 17 at the end of one arm 21c thereof. The other arm 21b thereof is to be attracted by an electromagnet 20. The arm 21c having said stopper tip 21a is urged in the counterclockwise direction to separate the tip 21a from the serrated portion 17 by means of a tension spring 23 and to separate the other arm 21b from the electromagnet 20. There is provided a stopper pin 24 fixed to the plate 9 to limit the counterclockwise rotation of the lever 21.

The electromagnet 20 is energized by pulses supplied thereto to repeatedly make the stopper lever 21 engaged with and disengaged from the teeth 17a, 17b, 17c . . . 17e of the serrated portion 17.

The rotatable ring 13 has a radially extending projection 18 which is stopped by a pair of pins 19a and 19b fixed to the plate 9 to limit the rotation of the ring 13. One pin 19a is to limit the rotation of the ring 13 when the filter is set, and the other pin 19b is to stop the ring 13 at a position of the maximum transmittivity.

In the ready state where the radially extending projection 18 is in contact with the pin 19a as shown in FIG. 2, the rotatable polarization filter 12 is in the position to make the transmittivity of the polarization filter combination composed of the fixed filter 11 and the rotatable filter 12 the lowest. When the rotatable filter 12 is rotated by 90° from said position with the projection 18 set to be in contact with the pin 19b, the transmittivity of the polarization filter combination 11 and 12 becomes the highest. As is well known in the art, the transmittivity of the polarization filter combination 11 and 12 can be varied by rotating the rotatable polarization filter 12 with respect to the fixed polarization filter 11. By stopping the rotation of the rotatable ring 13 in the course of the rotation thereof, an intermediate value of transmittivity can be obtained. The teeth 17a, 17b, 17c . . . 17e are provided at such intervals that the transmittivity of the variable filter 10 is reduced by half when the rotatable ring 13 is rotated by one tooth.

The angle of rotation of the rotatable ring 13 is controlled by the number of pulses supplied to the electromagnet 20. The stopper lever 21 is repeatedly engaged with and disengaged from the teeth 17a, 17b, 17c . . . 17e by number of times corresponding to the number of pulses supplied thereto. In the embodiment as shown in FIG. 2, the electromagnet 20 is required to keep being energized until the shutter closes when it has finished the required number of energizations. The number of the pulses is determined in accordance with various exposure factors such as the scene brightness, the film sensitivity, the aperture size of the diaphragm and the exposure time.

In the present invention, the various exposure factors are calculated together in accordance with APEX system (Additive System of Photographic Exposure) in which the scene brightness $Cd/m^2$) the film sensitivity (ASA), the aperture size (F-number) and the exposure time (second) are represented by log-compressed sequential numbers which linearly increase as these exposure factors increase logarithmically. The numbers according to the APEX system are designated by BV for the scene brightness, SV for the film sensitivity, AV for the aperture size and TV for the exposure time. The transmittivity of the filter is also represented by log-compressed sequential number FV which linearly increases as the transmittivity of the filter logarithmically decreases. The numbers according to the APEX system are interrelated with each other as follows;

$$FV = BV + SV - AV - TV \qquad (1)$$

The numbers according to the APEX system are determined in accordance with the following Table I.

TABLE I

| No. | 0 | 1 | 2 | 3 | 4 | 5 |
|---|---|---|---|---|---|---|
| FV | 1 | 1/2 | 1/4 | 1/8 | 1/15 | 1/30 |
| BV (Cd/m²) | 3.43 | 6.85 | 13.70 | 27.41 | 54.8 | 109.6 |
| SV (ASA) | | | | 25 | 50 | 100 |
| AV (F) | 1 | 1.4 | 1.8 | 2.8 | 4 | 5.6 |
| TV (sec) | 1 | 1/2 | 1/4 | 1/8 | 1/15 | 1/30 |
| No. | 6 | 7 | 8 | 9 | 10 | 11 |
| FV | 1/60 | 1/125 | 1/250 | 1/500 | 1/1000 | 1/2000 |
| BV (Cd/m²) | 219 | 439 | 877 | 1750 | 3510 | 7020 |
| SV (ASA) | 200 | 400 | 800 | 1600 | 3200 | 6400 |
| AV (F) | 8 | 11 | 16 | 32 | | |
| TV (sec) | 1/60 | 1/125 | 1/250 | 1/500 | 1/1000 | 1/2000 |

As shown in the formula (1), the APEX number FV of the desired transmittivity of the variable filter 10 is obtained by adding the number SV of the film sensitivity to the number BV of the scene brightness and subtracting therefrom the number AV of the aperture size and the number TV of the exposure time. Therefore, by conducting the calculation of the above formula, the desired number FV of the filter can be obtained. For example, when the scene brightness is 54 Cd/m² (BV=4), the film sensitivity is ASA3200 (SV=10), the aperture size is F:4 (AV=4) and the exposure time is 1/250 second (TV=8), the number of the filter FV is calculated to be 2 as follows.

$$FV = 4 + 10 - 4 - 8 = 2$$

This means that the variable filter 10 should be controlled to make the transmittivity thereof ¼ of the maximum transmittivity. In the present invention, in this case, the electromagnet 20 is supplied with two pulses to rotate the ring 13 by two steps.

It will be noted that although the number of said teeth 17a, 17b, 17c ... 17e shown in FIG. 2 is five, it should be more than five, preferably eleven in view of Table I, in the practical application.

When the shutter is closed and the shutter operation is completed, the motor 15 is reversely rotated to put the variable filter 10 in its original state and the electromagnet 20 is deenergized to separate the stopper lever 21 from the serrated portion 17.

An embodiment of the electric circuit for supplying pulses to the filter controlling electromagnet 20 will hereinbelow be described in detail referring to FIGS. 3 to 8.

A clock pulse generator 30 comprised of a multivibrator is provided to generate clock pulses as shown in FIG. 4A at a predetermined frequency. Four gate circuits 31, 32, 33 and 34 each consisting of an AND circuit are connected in parallel with the clock pulse generator 30. BV input means 35, AV input means 36, SV input means 37 and TV input means 38 are connected with said gate circuits 31, 32, 33 and 34, respectively, to give gate signals as shown in FIGS. 4B, 4D, 4F and 4H to the gate circuits 31–34. While the gate signals are supplied to the gate circuits 31–34, the gate circuits 31–34 are opened to transmit the clock pulses to an arithmetic unit 40 connected therewith.

The gate signals from the input means 35–38 are synchronized with each other to open the gate circuits 31–34 simultaneously by means of a starting pulse 39 supplied thereto.

Figure 6A:
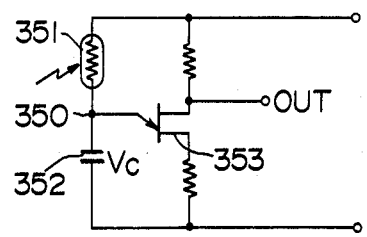
FIG. 6A shows an example of a circuit for supplying a signal representing the scene brightness employed in the filter control circuit as shown in FIG. 3.
Figure 6B:
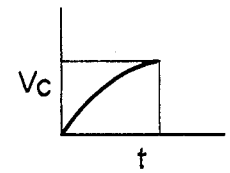
FIG. 6B is a curve showing the voltage charged in a capacitor in the circuit of FIG. 6A.
Figure 6C:
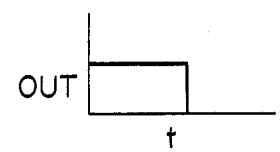
FIG. 6C shows the output of the circuit of FIG. 6A.
Figure 8:
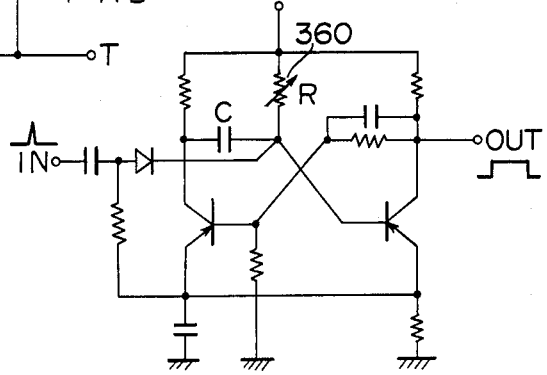
FIG 8 shows a monostable multivibrator employed for setting various exposure factors in the filter control circuit as shown in FIG. 3.

The gate signals from the input means 35–38 are pulses having a width representing the exposure information corresponding to said APEX numbers respectively. As shown in FIG. 6A, the BV input means 35 for giving a signal representing the scene brightness employs a photodetector 351 and a capacitor 352 connected in series therewith and a transistor 353 connected with the connecting point 350 therebetween to give an output signal as shown in FIG. 6C corresponding to the gate signal as shown in FIG. 4B. FIG. 6B shows a curve of the voltage charged in the capacitor 352. The width of the output pulse as shown in FIG. 6C represents the scene brightness. In the example as shown in FIGS. 4A to 4J, the width of the pulse representing the scene brightness is so long as to transmit four clock pulses as shown in FIG. 4C to the arithmetic unit 40. The AV input means 36, the SV input means 37 and the TV input means 38 for giving gate signals for the aperture size, the film sensitivity and the exposure time, respectively, are each comprised of a monostable multivibrator as shown in FIG. 8. The monostable multivibrator includes a variable resistor 360 which is manually controlled to set an exposure factor therein. For instance, the variable resistor 360 is connected with a diaphragm control ring so that the width of the pulse generated from the monostable multivibrator including the variable resistor 360 may represent the actually effecting aperture size of the diaphragm. Similarly, the variable resistor 360 is connected with a film sensitivity setting dial or a shutter speed setting dial so that the width of the pulse generated from the input means 37 and 38 may represent the film sensitivity and the exposure time, respectively. While the output level of the gate signals from the input means 36, 37 and 38 is high, the clock pulses from the clock pulse generator 30 are transmitted to the arithmetic unit 40 to send the controlled number of pulses from the four input means 35–38 to the arithmetic unit 40 simultaneously. One cycle of the pulse sending operation is selected to include twelve clock pulses in this embodiment as shown in FIG. 4A to sufficiently cover the possible number of pulses for the exposure factors as shown in Table I. The number of pulses included in one cycle of the operation may not be 12 but may be 24 or 36 or larger if the input means would be so designed and the number of the flip-flop circuits is increased to enhance the accuracy of control.

Figure 7:
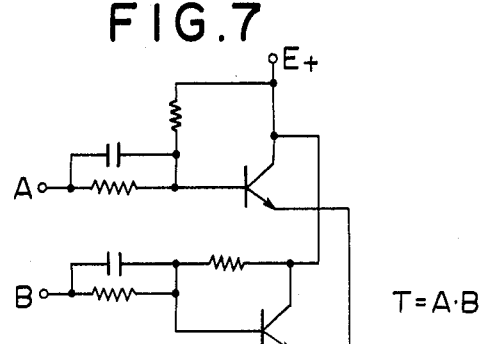
FIG. 7 shows an example of a gate circuit employed in the circuit as shown in FIG. 3.

As for the gate circuits 31–34, well known AND circuits as shown in FIG. 7 can be employed.

The output of the arithmetic unit 40 which calculates the four sets of pulses from said four gate circuits 31–34 is transmitted to four flip-flop circuits 42a–42d connected in series which is capable of conducting addition up to 16. The outputs of the flip-flop circuits 42a–42d are sent to a decoder 43 which is connected with an indicator 44 to indicate the calculated result in the camera and a filter control means 45 as said electromagnet 20 to control the variable filter 10. As for the indicator, a digital indicator employing LEDs may be used which is located in the visual field of the view finder of the camera.

In case that the output of the arithmetic unit is minus, the calculation must be tried again by changing some of the input exposure factors. A minus indicator 41 is connected with the arithmetic unit 40 to indicate the minus result when the sum of the four sets of pulses is minus so that the photographer may be aware of it.

The arithmetic unit 40 is designed to conduct the calculation as formulated in said formula (1) in the manner changed as the following formula in this embodiment;

$$FV = (BV - AV) + (SV - TV) \quad (2)$$

in order to simplify the structure of the circuit thereof.

When the APEX numbers BV, AV, SV and TV are 4, 4, 10 and 8 as said example, 4, 4, 10 and 8 pulses are transmitted to the arithmetic unit 40 through said gate circuits 31–34 as shown in FIGS. 4C, 4E, 4G and 4I, respectively. The calculation of the four sets of pulses are conducted according to the formula (2) as follows;

$$FV = (4 - 4) + (10 - 8) = 2.$$

Thus, two pulses are generated from the arithmetic unit 40 as shown in FIG. 4J. The two pulses are transmitted to said filter control means 45 as said electromagnet 20 through said flip-flop circuits 42a–42d and said decoder 43 to rotate said rotatable ring 13 by two steps to effect the desirable transmittivity (FV=2) of the variable filter 10 and is also transmitted to said indicator 44 as a digital LED-indicator to indicate the number "2" in the view finder system of the camera.

Figure 5:
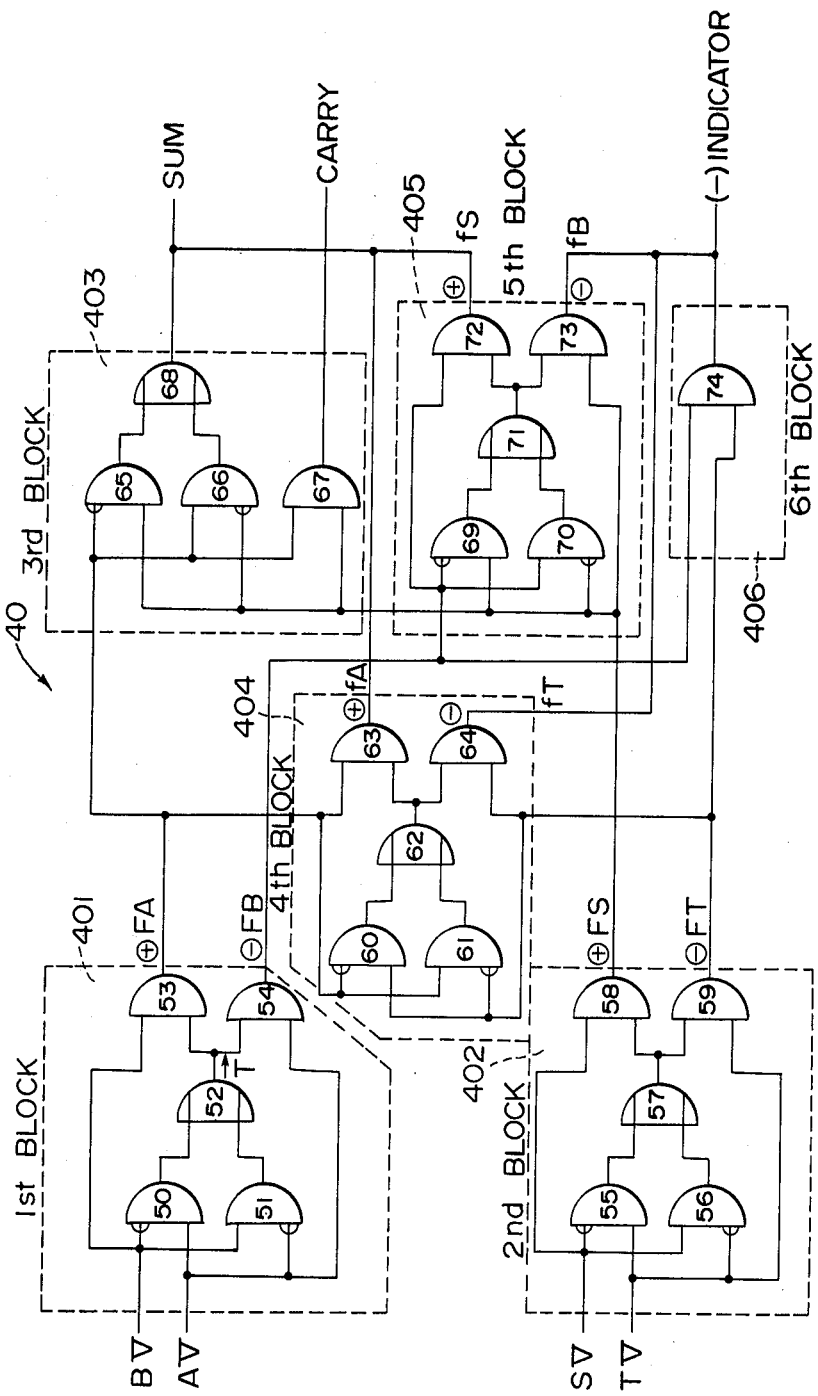
FIG. 5 is a block diagram showing an embodimnt of the arithmetic unit employed in the filter control circuit as shown in FIG. 3.

Now the arithmetic unit 40 for conducting the calculation to simply add the four sets of pulses which are simultaneously supplied thereto will be described in detail referring to FIG. 5.

The arithmetic unit 40 comprises six blocks 401–406. Since first, second, fourth and fifth blocks 401, 402, 404 and 405 are of the same structure, the description will hereinbelow be made only with reference to the first, third and sixth blocks 401, 403 and 406.

The first block 401 comprises inhibit circuits 50 and 51, an OR circuit 52 connected therewith and AND circuits 53 and 54, and the operation thereof is as indicated in the following Table II wherein T-output indicates the output of the OR circuit 52 and FA- and FB-outputs indicate the outputs of the AND circuits 53 and 54, respectively.

TABLE II

| BV signal | AV signal | T-output | FA-output | FB-output |
|---|---|---|---|---|
| 0 | 0 | 0 | 0 | 0 |
| 1 | 0 | 1 | 1 | 0 |
| 0 | 1 | 1 | 0 | 1 |
| 1 | 1 | 0 | 0 | 0 |

The second, fourth and fifth blocks 402, 404 and 405 operates in the same manner as the first block 401 as described above.

The above operation can be represented as follows.

FIRST BLOCK 401

When BV>AV, output appears on (+) side .... FA
When BV<AV, output appears in (−) side .... FB

SECOND BLOCK 402

When SV>TV, output appears on (+) side .... FS
When SV<TV, output appears on (−) side .... FT

FOURTH BLOCK 404

When FA>FT, output appears on (+) side .... fA
When FA<FT, output appears on (−) side .... fT

FIFTH BLOCK 405

When FS>FB, output appears on (+) side .... fS
When FS<FB, output appears on (−) side .... fB The third block 403 is comprised of a half-adder and operates as indicated in the following Table III.

TABLE III

| FA | FS | SUM | CARRY |
|---|---|---|---|
| 0 | 0 | 0 | 0 |
| 1 | 0 | 1 | 0 |
| 0 | 1 | 1 | 0 |
| 1 | 1 | 0 | 1 |

The output of the third block 403 is supplied to the flip-flop circuits 42a–42d. The sum signal is counted as one unit of pulse when the sum of the outputs FA and FS is "1", and the carry signal is counted when the sum is "2". Since there is no possibility of generating the sum "1" and "2" simultaneously, the third block 403 can be a normal half-adder. The outputs fA and fS are directly put into the flip-flop circuit 42a to be counted as one unit of pulse.

The sixth block 406 includes an AND circuit 74 connected with the outputs FB(−) and FT(−) and generates an output when the sum of the formula (2) is minus. The outputs fB and fT are connected with the minus indicator 41 to indicate a minus sum.

Thus, the arithmetic unit 40 conducts the calculation as formulated in the formula (2) and outputs a sum, a carry signal and a minus signal.

Figure 3:
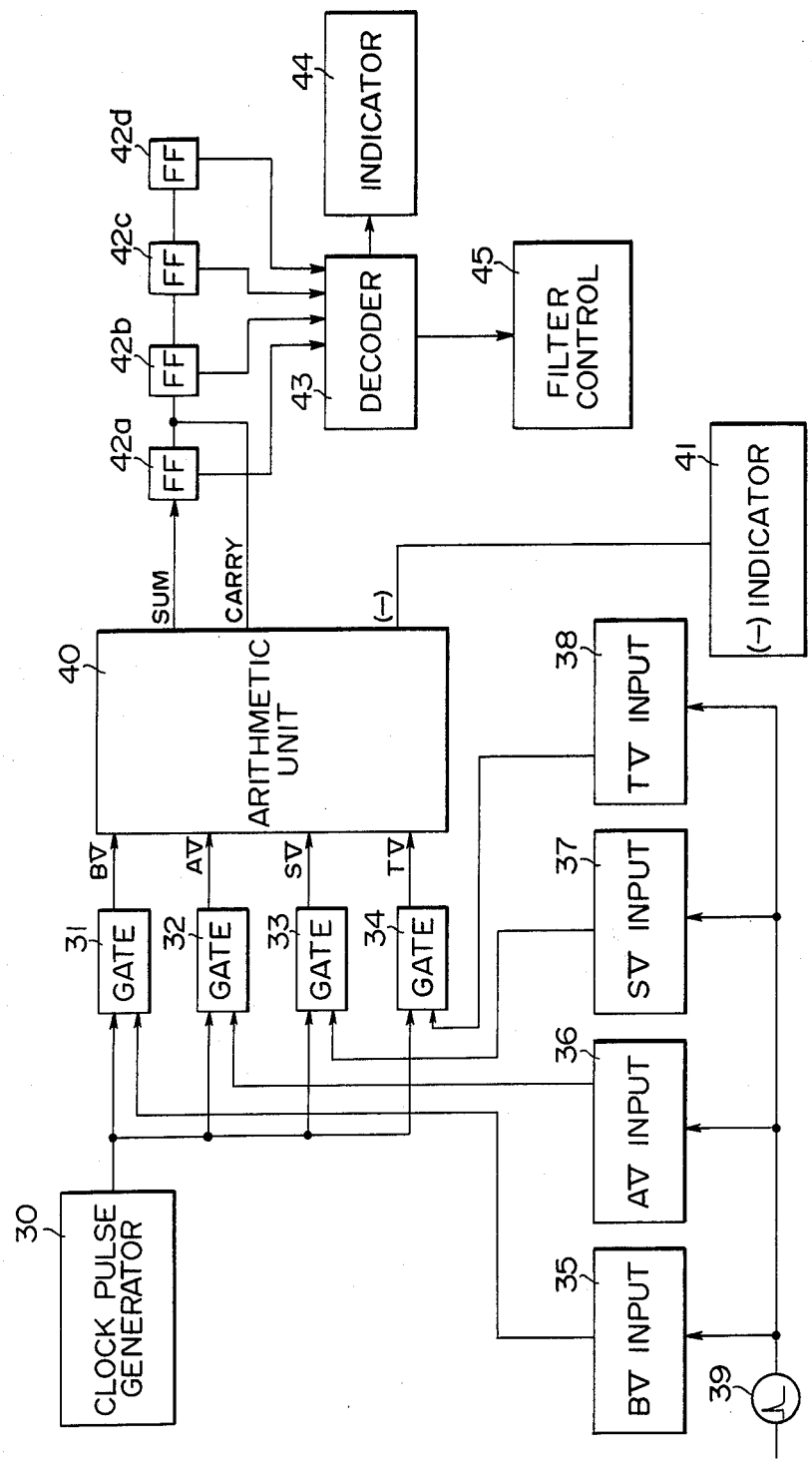
FIG. 3 is a schematic diagram showing an embodiment of the filter control circuit for supplying pulses to a pulse driven filter controlling means.

Further, it will be understood by those skilled in the art that a camera with a semi-automatic filter control means can be provided by eliminating the control means 45 from the system as shown in FIG. 3. Without the filter control means 45, the photographer can manually control the filter operating member in view of the number indicative of the APEX number of the filter indicated in the visual field of the camera.

Figure 11:
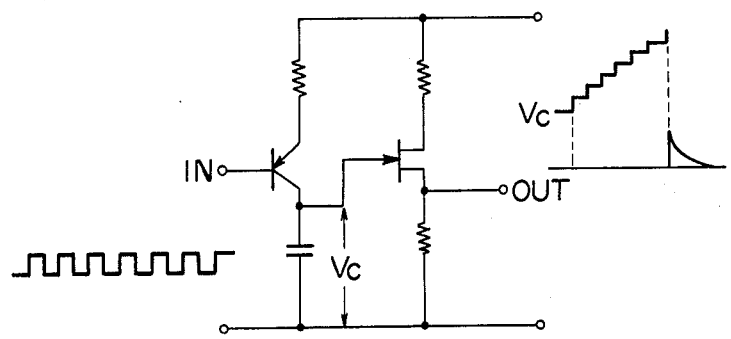
FIG. 11 shows a divider employed for dividing clock pulses employed in the filter control circuit as shown in FIG. 9.

Another embodiment of the electric circuit for supplying pulses to the filter controlling electromagnet 20 will hereinbelow be described in detail referring to FIGS. 9 to 11.

A clock pulse generator 80 such as a multivibrator which generates clock pulses as shown in FIG. 10A at a predetermined frequency is connected with a flip-flop circit 86 which divides the clock pulses by half as shown in FIG. 10B. The output of the flip-flop circuit 86 is further divided by a sixth as shown in FIG. 10C by a divider 87 as shown in FIG. 11 which generates a staircase. The divided output from the divider 87 is supplied to a series of ring counters 91–94. The ring counters 91–94 are connected with exposure factor input means 81–84, respectively, to start the input means 81–84 sequentially every twelve pulses. The first input means 81 is for the scene brightness (BV) and corresponds to the input means 31 employed in the first embodiment as shown in FIG. 3 comprising a photodetector and a capacitor. The second, third and fourth input means 82, 83 and 84 are for the aperture size (AV), the film sensitivity (SV) and the exposure time (TV), and correspond to said input means 32, 33 and 34, respectively, each comprising a monostable multivibrator. The first input means 81 is started to generate a pulse having a width representing the scene brightness when a trigger pulse is supplied thereto by the first ring counter 91. Similarly, the second, third and fourth input means 82, 83 and 84 are started to generate a pulse having a width representing the exposure factor when a trigger pulse is supplied thereto by the second, third and fourth ring counters 92, 93 and 94, respectively.

In this embodiment, the second input means 82 which supplies a pulse representing the aperture size and the fourth input means 84 which supplies a pulse representing the exposure time are designed to supply a pulse having a width corresponding to the number of pulses supplementary to the APEX number of the desired aperture size and the exposure time with respect to 10. In other words, the number of pulses corresponding to the width of the pulse output from the second input means 82 for giving information concerning AV is 10-AV, and the number of pulses corresponding to the width of the pulse output from the fourth input means 84 for giving information concerning TV is 10-TV. Accordingly, the sum of the pulses corresponding to the width of the pulses supplied by the four input means 81-84 is $$BV + SV + (10-AV) + (10-TV) \qquad (3)$$

which can be represented as $$FV + 20$$

in view of the formula (1).

Therefore, the total sum of the four sets of pulses simply added together indicates the APEX number of the transmittivity of the filter FV plus 20. Accordingly, the unit digit of the total sum (FV+20) indicates the APEX number (FV) of the filter transmittivity. Thus, the calculation of the four sets of pulses is simplified by the present embodiment.

The output pulses from the input means 81-84 are sequentially supplied to an OR circuit 85 connected therewith as shown in FIGS. 10H to 10K. The OR circuit 85 is connected with a gate circuit 95 comprised of an AND circuit which is also connected with said clock pulse generator 80 so that the gate circuit 95 may transmit the clock pulses as shown in FIG. 10A to a counter 96 connected therewith while the gate circuit 95 is supplied with a pulse from the OR circuit 85 as shown in FIGS. 10L and 10M. Thus, the total sum of the clock pulses calculated according to the formula (3) is counted by the counter 96 and the unit digit thereof is transmitted to a filter control means 97 to control the variable filter 10 accordingly.

Although the unit digit of the total sum FV + 20 indicates the FV when it is not less than 20 and and less than 30, it does not indicate the FV but is different therefrom by 10 (or 20). Therefore, an over-under detector 98 is connected with the counter 96 to detect that the total sum counted by the counter 96 is less than 20 or not less than 30. The output of the detector 98 is supplied to said filter control means 97 to prevent the malfunction thereof when the output sum is not within the range of filter control between 20 and 29 inclusive. Further, an indicator 99 is connected with the over-under detector 98 to indicate that the total sum counted by the counter 96 is not within the range of filter control.

The over-under detector 98 can be made by forming a circuit which detects that the tenth digit of the total sum counted by the counter 96 is smaller or larger than 2.

As in the first embodiment, the filter control means 97 can be eliminated to provide a semi-automatic filter control camera. Further, it will be understood by those skilled in the art that the over-under detector 98 may not be provided in the camera if an indicator which indicates the total sum of the pulses (FV+20) is provided in the camera since skilled photographers could be aware of the extremely different number of the unit digit indicated and know the correct number different therefrom by 10 (or 20).

I claim:

1. A photographic camera with a taking lens having an optical axis comprising a diaphragm the aperture size of which is variable provided on the optical axis of the taking lens, means manually operable to select the aperture size of the diaphragm, a shutter mechanism the exposure time of which is variable provided on the optical axis of the taking lens, means manually operable to select the exposure time of the shutter mechanism, a filter the transmittivity of which is variable provided on the optical axis of the taking lens, means for varying the transmittivity of the filter, a film sensitivity setting means provided in the camera to be set at a position which is indicative of the sensitivity of the film loaded in the camera, and a scene brightness measuring means provided in the camera for measuring the brightness of the scene to be photographed by the camera wherein the improvement comprising, a scene brightness input means connected with said scene brightness measuring means for creating pulses the number of which corresponds to the scene brightness measured thereby, an aperture size input means connected with said manually operable aperture size selecting means for creating pulses the number of which corresponds to the aperture size selected thereby, an exposure time input means connected with said manually operable exposure time selecting means for creating pulses the number of which corresponds to the exposure time selected thereby, a film sensitivity input means connected with said film sensitivity setting means for creating pulses the number of which corresponds to the sensitivity of the film set thereby, an arithmetic unit connected with all said input means to receive said pulses and conduct calculation of said pulses for generating an output indicative of the desirable transmittivity of the filter, and means for transmitting the output of the arithmetic unit to said means for varying the transmittivity of the filter to control the transmittivity of the filter in accordance with the output of the arithmetic unit.

2. A photographic camera as claimed in claim 1 wherein the output of said arithmetic unit is composed of pulses the number of which corresponds to the desirable transmittivity of the filter and said means for varying the transmittivity of the filter comprises a filter driving means for varying the transmittivity of the filter and a control means for receiving pulses and stopping the filter driving means in accordance with the pulses received thereby.

3. A photographic camera as claimed in claim 2 wherein the number of said pulses created by said input means corresponds to the number determined by the APEX system.

4. A photographic camera as claimed in claim 3 further comprising a warning means connected with said arithmetic unit which indicates that the output number of pulses generated thereby is minus or not less than ten.

5. A photographic camera as claimed in claim 3 wherein said pulses created by said aperture size input means and said exposure time input means are of the supplementary number of the number determined by the APEX system with respect to ten, whereby the pulses put into the arithmetic unit are only added together.

6. A photographic camera as claimed in claim 5 further comprising a warning means connected with said arithmetic unit which indicates that the output number of pulses generated thereby is less than 20 or not less than 30.

7. A photographic camera as claimed in claim 1 further comprising an indicating means connected with said arithmetic unit for indicating the output thereof.

8. A photographic camera as claimed in claim 7 wherein said camera has a view finder and said indicating means is provided in the visual field of the view finder.

* * * * *